United States Patent
Billmaier

(10) Patent No.: US 6,630,963 B1
(45) Date of Patent: Oct. 7, 2003

(54) SYNCHRONIZING A VIDEO PROGRAM FROM A TELEVISION BROADCAST WITH A SECONDARY AUDIO PROGRAM

(75) Inventor: Brittany R. Billmaier, Woodinville, WA (US)

(73) Assignee: Digeo, Inc., Kirkland, WA (US)

( * ) Notice: Subject to any disclaimer, the term of this patent is extended or adjusted under 35 U.S.C. 154(b) by 433 days.

(21) Appl. No.: 09/768,019

(22) Filed: Jan. 23, 2001

(51) Int. Cl.[7] .................. H04N 7/08; H04N 9/475
(52) U.S. Cl. .................. 348/485; 348/738; 348/515; 725/109
(58) Field of Search ................ 348/485, 738, 348/465, 462, 553, 515, 729; 725/32, 109–111, 51, 61

(56) References Cited

U.S. PATENT DOCUMENTS

| | | | |
|---|---|---|---|
| 4,682,370 A | 7/1987 | Matthews | 455/166 |
| 5,289,288 A * | 2/1994 | Silverman et al. | 358/335 |
| 5,440,351 A | 8/1995 | Ichino | 348/729 |
| 5,585,858 A * | 12/1996 | Harper et al. | 348/485 |
| 5,764,965 A * | 6/1998 | Poimboeuf et al. | 395/551 |
| 5,894,320 A | 4/1999 | Vancelette | 348/7 |
| 5,900,908 A * | 5/1999 | Kirkland | 348/62 |
| 5,930,444 A | 7/1999 | Camhi et al. | 386/46 |
| 6,018,768 A | 1/2000 | Ullman et al. | 709/218 |
| 6,209,028 B1 | 3/2001 | Walker et al. | 709/219 |
| 2001/0025377 A1 * | 9/2001 | Hinderks | 725/109 |

* cited by examiner

*Primary Examiner*—Victor R. Kostak
(74) *Attorney, Agent, or Firm*—Kory D. Christensen; Stoel Rives LLP

(57) ABSTRACT

According to one embodiment, in response to a user pressing an alternative audio button while watching a television broadcast, the user is provided with a list of secondary audio programs (e.g., radio programs received via the Internet) to replace the primary audio program associated with the broadcast. After a secondary audio program is selected, a synchronization component determines an extra transmission delay associated with the secondary audio program. A buffering component then buffers the video program for a period of time equal to the extra delay. A mixing component then mixes the synchronized video program with the secondary audio program, which are then presented to the user.

30 Claims, 12 Drawing Sheets

SYNCHRONIZING A VIDEO PROGRAM FROM A TELEVISION BROADCAST WITH A SECONDARY AUDIO PROGRAM

BACKGROUND OF THE INVENTION

1. Field of the Invention

The present invention relates generally to the field of interactive television systems. More specifically, the present invention relates to systems and methods for synchronizing multiple signals transmitted via different means, such as, for example, a video signal transmitted via broadcast television and a secondary audio signal transmitted via the Internet.

2. Description of Related Background Art

Traditionally, both radio and television stations provide coverage for sporting events, such as football, basketball, baseball, etc. Indeed, multiple radio and television stations typically cover an event for both local and national audiences.

Although television offers the apparent advantage of allowing a person to see the sporting event, many prefer the radio for a number of reasons. For example, radio announcers often provide a better commentary since they must rely on words alone to describe the event. Moreover, radio broadcasts typically include fewer commercials, interviews, human interest stories, or the like, which tend to interrupt the event.

To obtain the advantages of both radio and television, some people watch a televised sporting event with the volume muted, while simultaneously listening to a radio commentary by their favorite announcer. As a result, the viewer obtains the benefits of better commentary, fewer interruptions, and the like, while also being able to watch the event. This approach is possible because television and radio broadcasts are typically received at same time with little or no relative delay.

Unfortunately, listening to radio coverage of a televised sporting event may not always be possible. For example, for events in remote cities, there may be no locally-broadcast radio coverage. In addition, a user may not be aware of which events are being broadcast on which radio stations.

Today, radio programs are beginning to be broadcast via the Internet. Radio signals are digitized, packetized, and transmitted to a receiver's computer using standard protocols such as TCP/IP (transmission control protocol/Internet protocol). Various standard software programs are available for receiving and playing radio signals transmitted via the Internet, such as RealPlayer Plus®, available from RealNetworks, Inc. of Seattle, Wash.

Advantageously, Internet-based radio transmissions are not geographically limited. Thus, a local radio station in New York City may be received via the Internet in Seattle or anywhere else in the world. It is now possible to choose from radio broadcasts from thousands of radio stations around the world via the Internet medium.

Unfortunately, the process including digitizing the radio signal, establishing a communication channel, and transmitting the radio signal via the Internet introduces a delay of several seconds when compared to a television signal broadcast, for example, via a cable network. Thus, the Internet-based radio coverage of a sporting event is delayed in time with respect to the television coverage, making a direct combination of the two undesirable due to lack of synchronization between the two signals.

What is needed, then, is a system and method for synchronizing a video program from television broadcast with a secondary audio program generated simultaneously with the video program. What is also needed is a system and method for replacing a primary audio program associated with a television broadcast with a second audio program. What is also needed is a system and method for allowing a user to easily select a secondary audio program to replace a primary audio program associated with a television broadcast.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

The present invention provides a solution to the above-described problems and difficulties. The present invention provides a method and system for synchronizing multiple signals transmitted by different means. For example, a method and system is described for synchronizing a video program transmitted via broadcast television with a secondary audio program (for example, a radio program) transmitted via the Internet. In another example, a method and system is described for synchronizing a video program transmitted via broadcast television with one or more programmed events (for example, directives to perform particular functions, such as displaying text or graphics or animation, playing streaming media, directing a browser to a particular web page, and the like).

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 1:
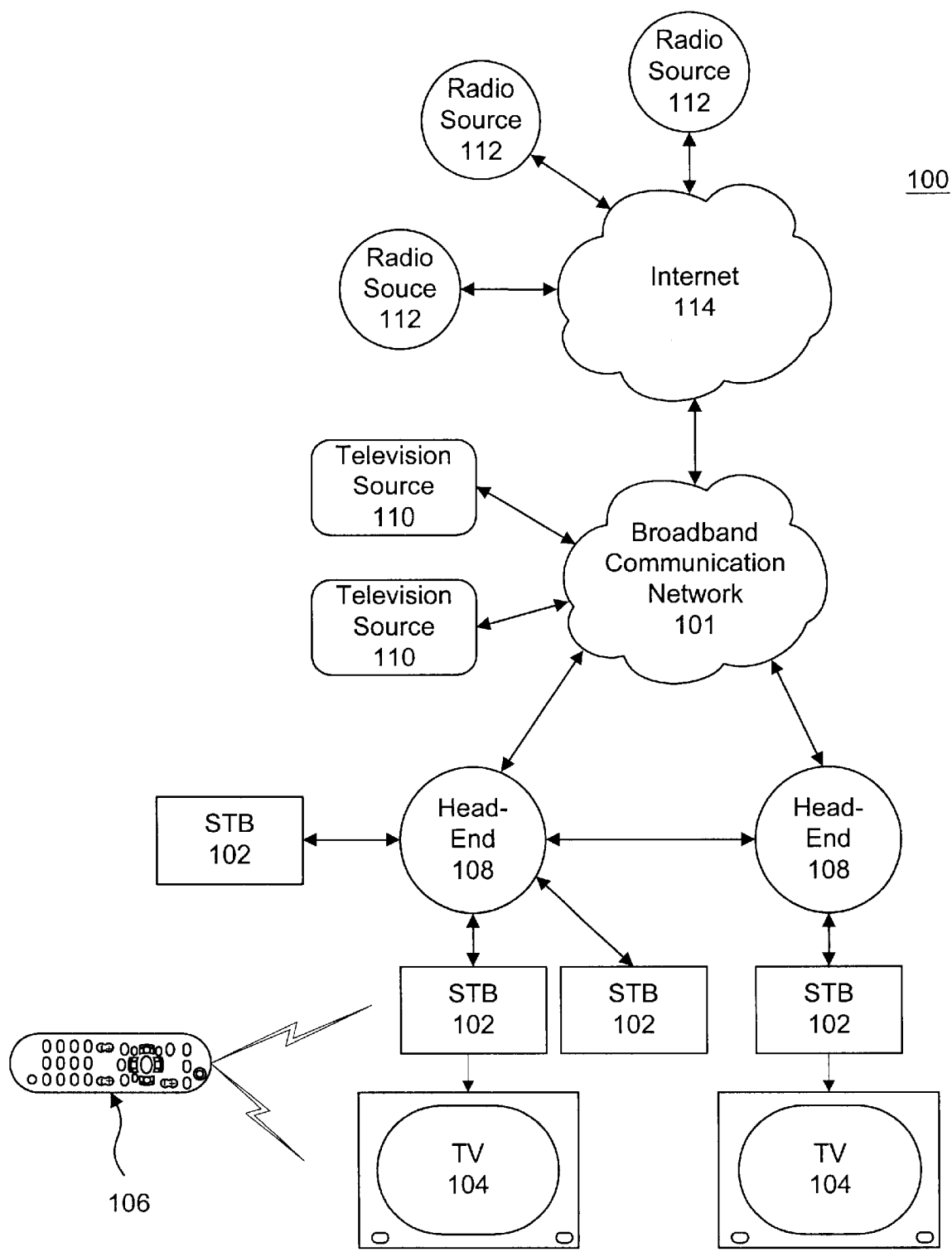
FIG. 1 is a block diagram of a system for distributing television programs and other forms of content.

Referring now to FIG. 1, there is shown a system 100 for delivering television programs and other forms of content to a plurality of customers. In one implementation, the system 100 includes a broadband communication network 101, such as a cable network. However, other networks are contemplated, one particular example of which is a satellite network.

In one configuration, the system 100 includes a plurality of set top boxes (STBs) 102 located, for instance, at customer homes. Generally, an STB 102 is a consumer electronics device that serves as a gateway between a customer's television and the network 101. In alternative embodiments, an STB 102 may be embodied more generally as a personal computer, an advanced television set, or another type of client terminal.

In one embodiment, an STB 102 receives encoded television signals and other information from the network 101 and decodes the same for display on a coupled television 104 or other display device (such as a computer monitor, flat panel display, or the like). As its name implies, an STB 102 is typically located on top of, or in close proximity to, the television 104.

Each STB 102 may be distinguished from other network components by a unique identifier, number, code, or address, examples of which include an IP (Internet Protocol) address or media access control (MAC) address. Thus, video streams and other information may be transmitted from the network 101 to a specific STB 102 by specifying the corresponding address, after which the network 101 routes the transmission to its destination using conventional techniques.

A remote control 106 is provided, in one embodiment, for convenient remote operation of the STB 102 and the television 104. The remote control 106 may use infrared (IR), radio frequency (RF), or other wireless technologies to transmit control signals to the STB 102 and the television 104. Other remote control devices are also contemplated, such as wired or wireless keyboards (not shown).

In one embodiment, each STB 102 is coupled to the network 101 via a head-end 108 or other distribution center. In the context of a cable network, a head-end 108 is generally a centrally-located facility where television programs are received from a local cable TV (CATV) satellite downlink or other source and packaged together for transmission to customer homes. In one configuration, a head-end 108 also functions as a Central Office (CO) in the telephone industry, routing video streams and other data to and from the various STB 102 devices serviced thereby.

The network 101 is preferably coupled to one or more television sources 110, which provide television programming for distribution to the STBs 102. Additionally, the network 101 may be coupled to one or more radio sources 112, which are accessed, in one embodiment, via the Internet 114. The Internet 114 is a "network of networks" and is well known to those skilled in the art. Communication over the Internet 114 is accomplished using standard protocols, such as TCP/IP (transmission control protocol/Internet protocol) and the like.

Figure 2:
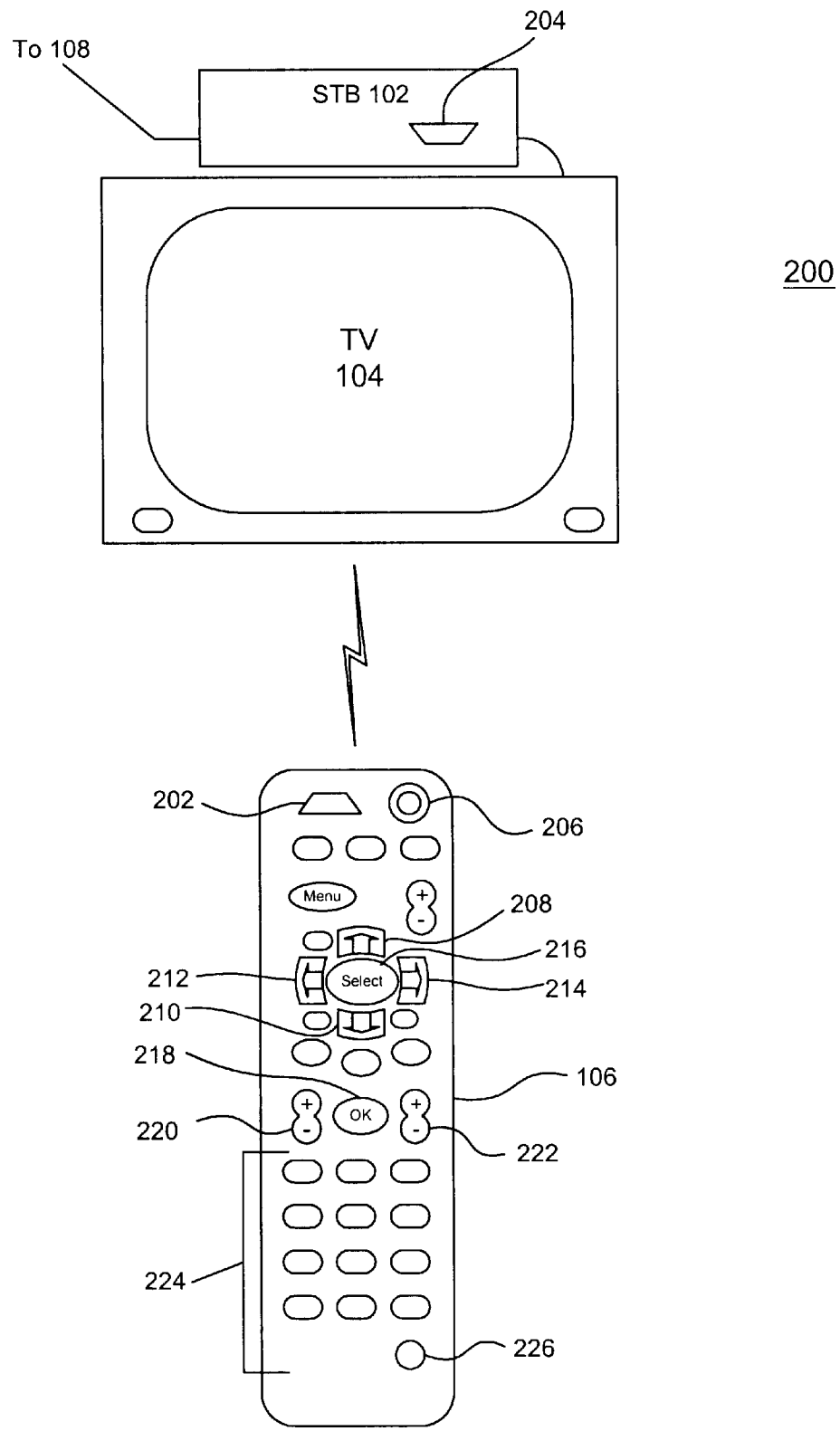
FIG. 2 is a block diagram of an interactive television system.

Referring now to FIG. 2, there is shown an interactive television system 200 according to an embodiment of the invention. As depicted, the system 200 may include an STB 102, a television 104 (or other display device), and a remote control 106. As noted above, the STB 102 is used to access the network 101 via a head-end 108. In an alternate embodiment, the functionality of the STB 102 is integrated into an advanced version of the television 104.

As noted, the remote control 106 is provided for convenient remote operation of the STB 102 and the television 104. In one configuration, control signals are transmitted from a wireless transmitter 202 in the remote control 106 to a wireless receiver 204 in the STB 102 (and television 104).

As shown in FIG. 2, the remote control 106 includes a plurality of buttons or similar controls. For instance, the remote control 106 may include a power button 206, an up arrow button 208, a down arrow button 210, a left arrow button 212, a right arrow button 214, a "Select" button 216, an "OK" button 218, channel buttons 220, volume buttons 222, alphanumeric buttons 224, and an alternative audio button 226. The functions of certain of the above-identified buttons will be discussed in greater detail below.

Figure 3:
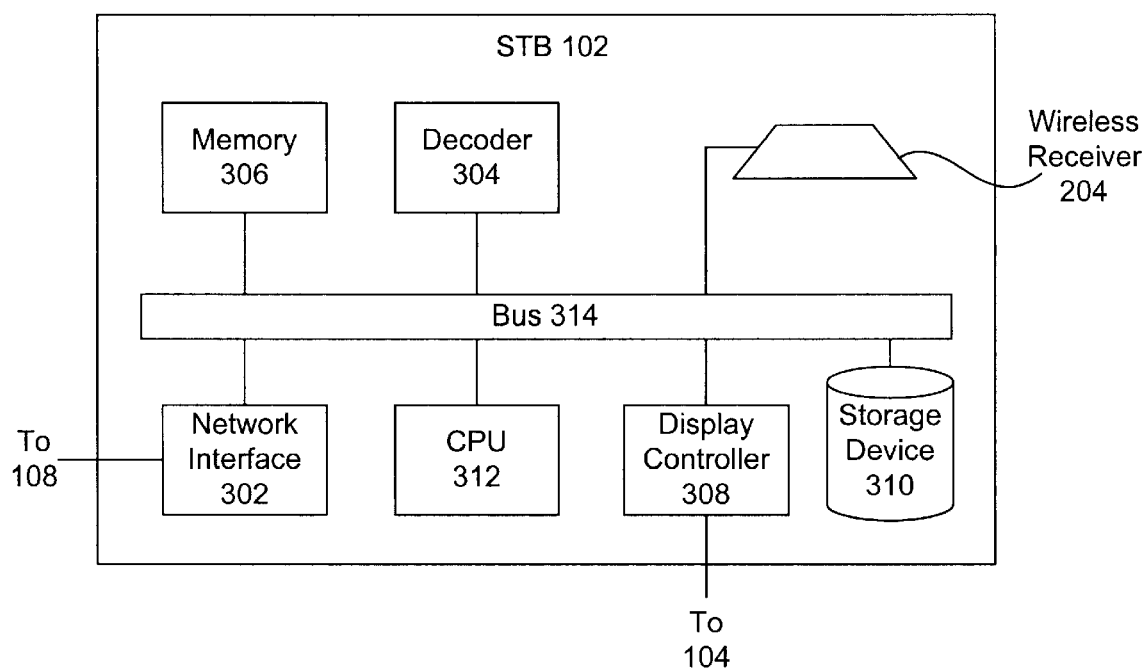
FIG. 3 is a block diagram of physical components of a set top box.

Referring now to FIG. 3, there is shown a physical block diagram of an STB 102 according to an embodiment of the invention. As noted above, the STB 102 includes a wireless receiver 204 for receiving control signals sent by the wireless transmitter 202 in the remote control 106. In various embodiments, the receiver 204 may be configured to receive IR, microwave, VHF, UHF, or other electromagnetic frequencies.

The STB 102 also includes, in one implementation, a network interface 302 for communicating with the network 101 via the head-end 108. The interface 302 may include conventional tuning circuitry for receiving MPEG (Moving Picture Experts Group) packets for a selected television channel. The interface 302 may also include conventional cable modem circuitry for sending or receiving other types of data. For example, the interface 302 may conform to the DOCSIS (Data Over Cable Service Interface Specification) or DAVIC (Digital Audio-Visual Council) standards.

In one configuration, one or more frequency bands (for example, from 5 to 30 MHz) may be reserved for upstream transmission. Digital modulation (for example, quadrature amplitude modulation or vestigial sideband modulation) may be used to send digital signals in the upstream transmission. Of course, upstream transmission is accomplished differently for different networks 101. Alternative ways to accomplish upstream transmission include using a back channel transmission, which is typically sent via an analog telephone line, ISDN, DSL, or other techniques.

In one implementation, the STB 102 also includes a decoder 304, such as an MPEG decoder, for decoding packets received from the network 101. As depicted, the decoder 304 may be implemented as a hardware component. Alternatively, or in addition, software decoding may be used.

The STB 102 further includes a memory device 306, such as a random access memory (RAM), configured to store data for temporary use. Similarly, a read-only memory (ROM) may be provided for storing more permanent data, such as fixed code and configuration information.

In one embodiment, a display controller 308 is provided for converting decoded digital video information into analog signals for display on the television 104. In alternative embodiments, the display controller 308 may provide a direct, digital video output for televisions 104 equipped to receive the same. Preferably, the display controller 308 includes graphics hardware for performing bit-block transfers (bit-blits) and other graphical operations.

In some implementations, the STB 102 may include a storage device 310, such as a hard disk drive or the like. The storage device 310 may be configured to record encoded television broadcasts and retrieve the broadcasts at a later time for decoding by the decoder 304 and display by the display controller 308.

The storage device 310 may also be used in various embodiments to store viewer preferences, parental lock settings, electronic programming guide (EPG) data, programming preferences, passwords, e-mail messages, information requests, and the like. In one implementation, the storage device 310 also stores an operating system (OS) for the STB 102, such as Windows CE® or Linux®.

A CPU 312 controls the operation of the STB 102, including the other components thereof, which are coupled to the CPU 312 via a bus 314. The CPU 312 may be embodied as a microprocessor, a microcontroller, a digital signal processor (DSP) or other device known in the art. As noted above, the CPU 312 may perform these and other operations based upon control signals generated by the remote control 106 and transmitted to the receiver 204.

Of course, FIG. 3 illustrates only one possible configuration of an STB 102. Those skilled in the art will recognize that various other architectures and components may be provided within the scope of the invention. In addition, various standard components of typical STB 102 are not illustrated in order to avoid obscuring aspects of the invention.

Figure 4:
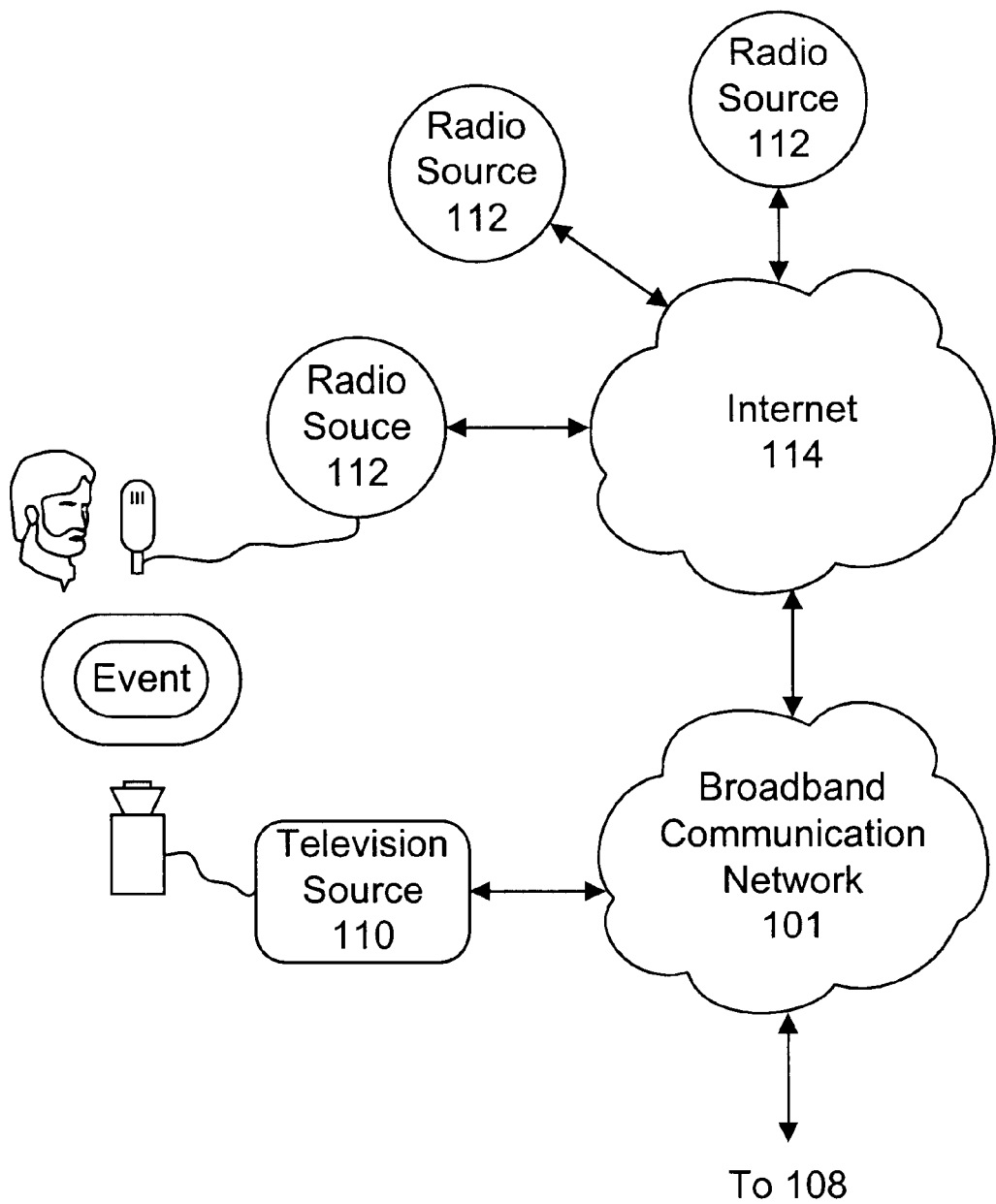
FIG. 4 is a block diagram of radio and television sources.

Reference is now made to FIG. 4 in which both radio and television sources 110, 112 provide coverage for an event, such as a sporting event. Of course, the invention is not limited to sporting events or any specific type of media coverage, such as radio or television. In one embodiment, a television source 110 captures a television signal (including a video and audio program) and transmits the same to the network 101 for distribution to a plurality of headends 108.

Simultaneously, a radio source 112 captures an audio signal, such as a commentary of a radio announcer. Preferably, the radio signal is digitized and converted into a stream of packets for transmission via the Internet 114. Various standard protocols may be used, such as audio over IP. RealNetworks, Inc. of Seattle, Wash. provides a number of systems for converting audio signals into network-compatible audio streams.

Typically, a radio signal received via the Internet 114 is delayed by several seconds when compared to a simultaneously-captured television signal received, for example, via a cable network. This is based on a number of factors, such as time required to digitize the radio signal, the time needed to establish a connection between a digital audio server and a client application, and the latency of the Internet 114. Thus, simply presenting the video television signal with the radio signal would not produce a satisfactory result since the two are not synchronized.

Figure 5:
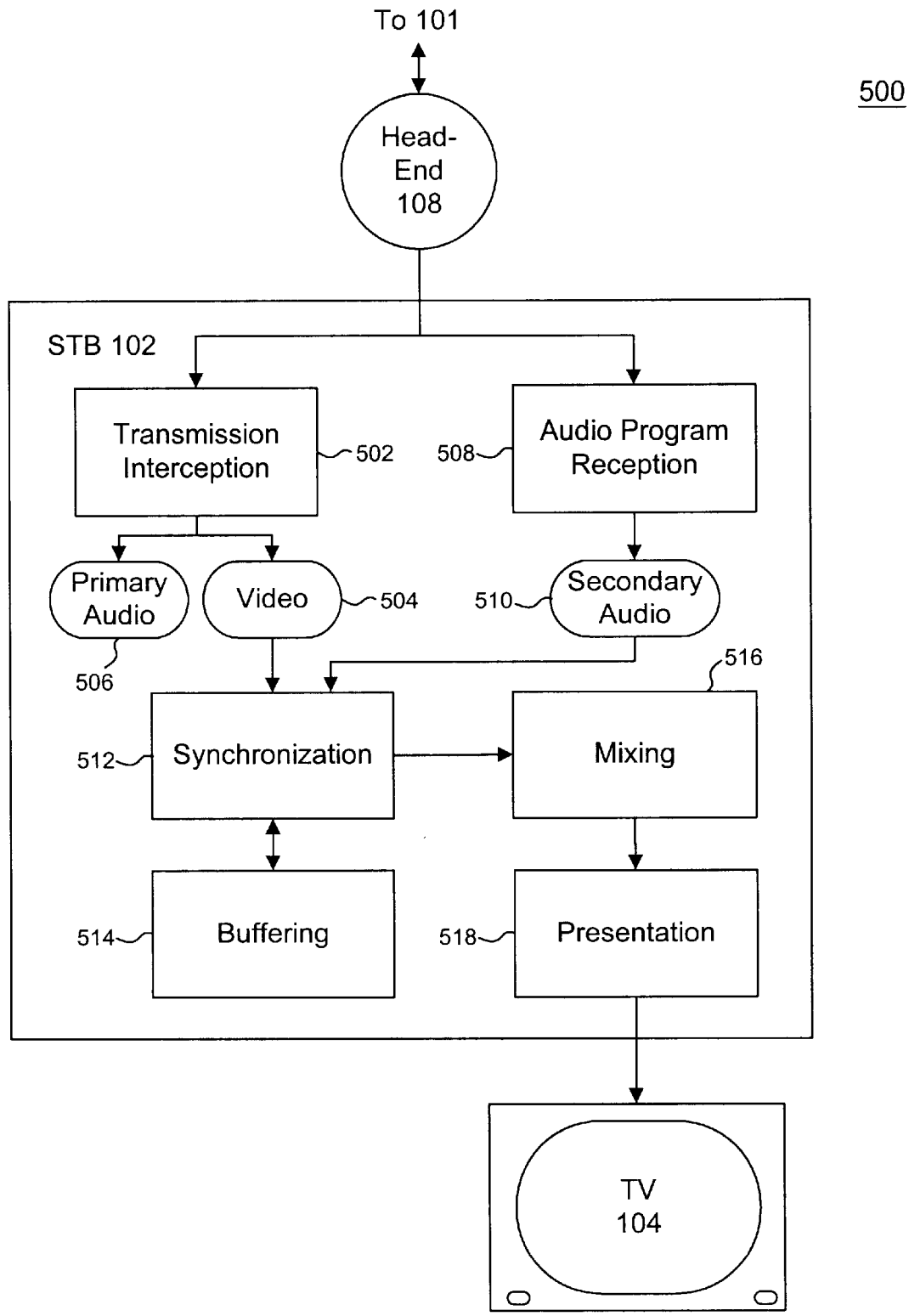
FIG. 5 is a block diagram of logical components of a system for synchronizing a video program with a secondary audio program.

FIG. 5 is a block diagram of various logical components of a system 500 for synchronizing a video program 504 with a secondary audio program 510. The depicted logical components may be implemented using one or more of the physical components shown in FIG. 3. Additionally, or in the alternative, various logical components may be implemented as software modules stored in the memory 306 and/or storage device 310 and executed by the CPU 312.

In the depicted embodiment, a transmission interception component 502 intercepts a television transmission received from a head-end 108. The transmission preferably includes a video program 504 and a primary audio program 506. The transmission interception component 502 may utilize, for example, the network interface 302 and the decoder 304 of FIG. 3 to receive an MPEG-encoded television broadcast from the head-end 108.

Concurrently, an audio program reception component 508 receives a secondary audio program 510, such as a radio program, generated simultaneously with and related to the video program 504. For example, the secondary audio program 510 may include a commentary of a radio announcer witnessing a sporting event depicted by the video program 504.

Various software components for receiving a radio program via the Internet 114 are known, such as RealPlayer Plus®, available from RealNetworks, Inc. of Seattle, Wash. Of course, the audio program reception component 508, as well as the other illustrated components, may also be implemented in hardware or firmware.

Due to the factors noted above, reception of the secondary audio program 510 may be delayed by several seconds with respect to the video program 504. Thus, if the secondary audio program 510 were simply mixed with the unsynchronized video program 504, the user may witness, for example, an interesting play in a sporting event, only to receive the corresponding radio commentary during a subsequent play.

Accordingly, a synchronization component 512 is provided to synchronize the video program 504 with the secondary audio program 510. As illustrated, the synchronization component 512 may include or make use of a buffering component 514 to buffer the video program 504 for a period of time approximately equal to the transmission delay. As explained in greater detail below, the buffering period may be pre-selected, user-adjustable, and/or calculated.

In one implementation, the buffering component 514 includes or makes use of the storage device 310 or the memory 306 of FIG. 3 to buffer the video program 504. For instance, the buffering component 514 may be embodied as a personal video recorder (PVR) device, one particular example of which is TiVo®, available from TiVo, Inc. of Alviso, Calif. A PVR typically includes a hard disk drive, an MPEG encoder/decoder, and various other hardware and software components to facilitate recording and playback of television programs. The hard disk drive typically has a capacity of 20–40 GB in order to facilitate recording of several hours of television programs.

Advantageously, a PVR, such as TiVo, often includes a feature for "pausing" television broadcasts. For example, when a pause button or the like is pressed, the displayed television program freezes while the PVR records the portion of the broadcast not displayed. When the pause button is pressed again, the PVR resumes the television program (using the recorded data) while simultaneously continuing to record the television program being currently broadcast. Thus, in one implementation, the pause feature may be activated for a period of the transmission delay.

Of course, other types of buffering components 514 may be used, one example of which is the memory 306 of the STB 102. In such an embodiment, several megabytes of random access memory (RAM) would be desirable in order to compensate for the transmission delay.

In one embodiment, a mixing component 516 mixes the synchronized video program 504 with the secondary audio program 510 prior to presentation. During the mixing process, the secondary audio program 510 is substituted for the primary audio program 506. Various techniques are known for substituting one audio channel for another. The mixing may be performed by the CPU 312 or by specialized audio hardware known in the art.

Finally, a presentation component 518 presents the combination of the video program 504 and the secondary audio program 510 to the user. The presentation component 518 may rely on the display controller 308 and other standard circuitry to send the video program 504 and the secondary audio program 510 to the television 104.

Figure 6:
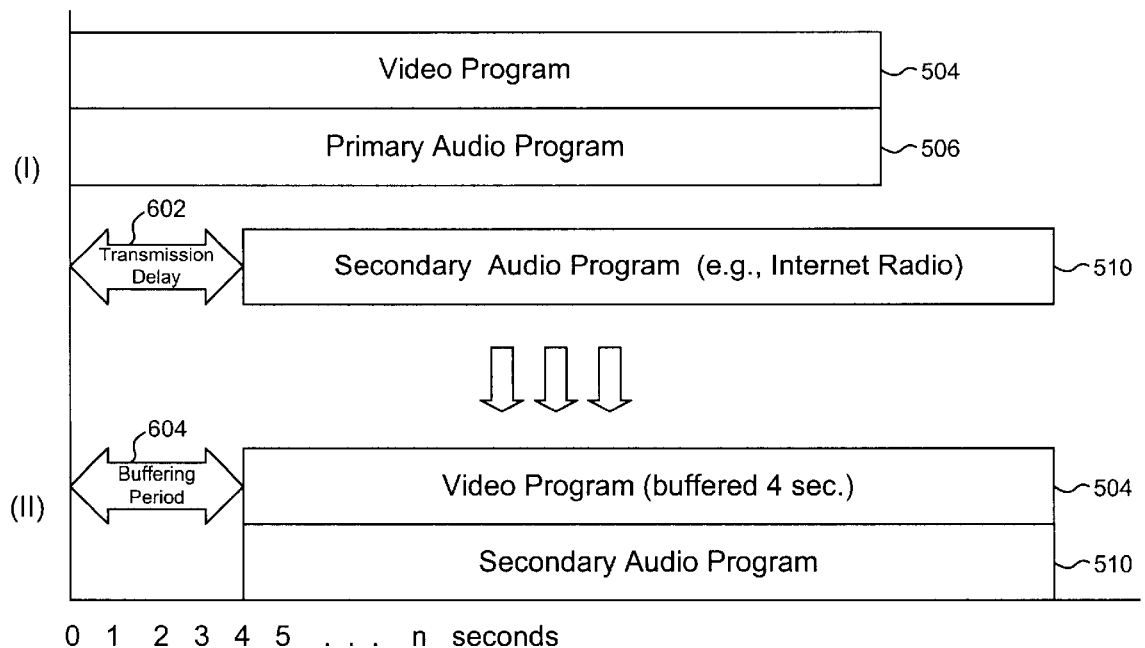
FIG. 6 is a time graph illustrating synchronization of a video program with a secondary audio program.

FIG. 6 is a time graph illustrating the synchronization process. In section (I), a television transmission including a video program 504 and a primary audio program 506 is received. The primary programs may be transmitted in analog form or in digital form. If digital, then the primary video and primary audio signals may be synchronized to each other using timestamps for decoding and presentation. In this case, a secondary audio program 510 is concurrently received. However, in this illustrative example, reception of the secondary audio program 510 is delayed with respect to the primary video program 504 by approximately four seconds due to an extra transmission delay 602. Section (II) shows the television transmission after the buffering component 514 buffers the video program 504 for a buffering period 604 of four (4) seconds and the mixing component 516 mixes video program 504 with the secondary audio program 510.

As previously noted, the buffering period 604 may be pre-selected, user-adjustable, and/or calculated. For example, a typical transmission delay 602 may range between two and five seconds, more often between three and four seconds. Accordingly, a default buffering period 604 may be set to between three seconds and four seconds.

However, an actual extra transmission delay 602 may deviate from the default value. Depending on the magnitude of the deviation, the buffering period 604 may require adjustment by the user. For example, the video program 504 may be buffered for a default buffering period 604, e.g., three or four seconds. Thereafter, the synchronized video program 504 and secondary audio program 510 may be mixed and presented to the user. Preferably, the user is provided with a mechanism for adjusting the buffering period 604 in order to manually synchronize the video program 504 with the secondary audio program 510.

Figure 7:
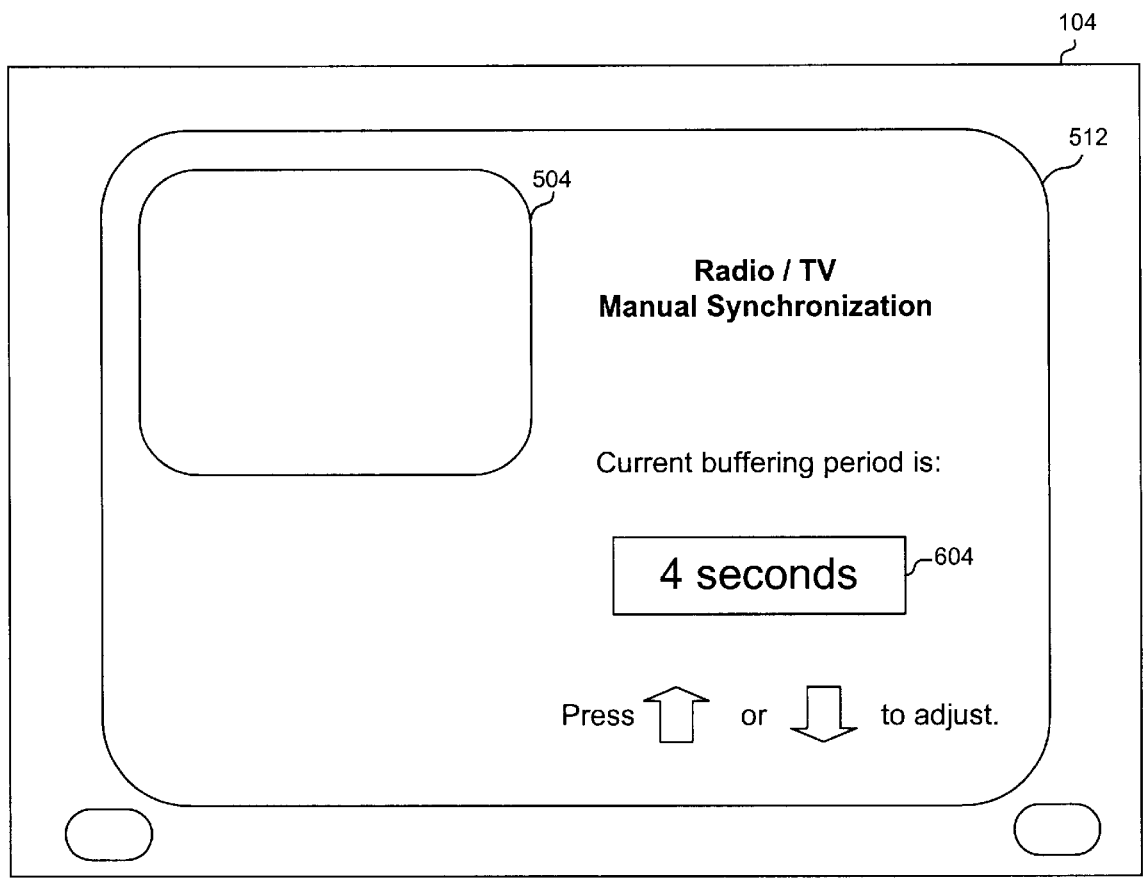
FIG. 7 is a user interface for manually synchronizing a video program with a secondary audio program.

For example, as shown in FIG. 7, the synchronization component 512 may provide a user interface in which the synchronized video program 504 and secondary audio program 510 are displayed with an indication of the buffering period 604. If the current buffering period 604 is greater or less than the transmission delay 602, the user may adjust the buffering period 604, for example, by pressing the up or down buttons 208, 210 on the remote control 106. Preferably, after each adjustment, the video program 504 is re-synchronized with the secondary audio program 510 according to the new buffering period 604, allowing the user to fine tune the audio/video synchronization.

Figure 8:
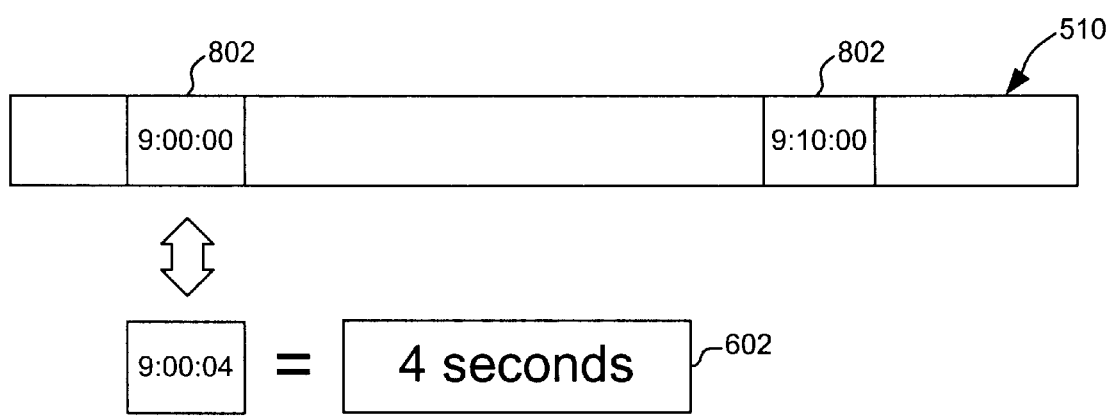
FIG. 8 is an illustration of synchronization packets within a secondary audio program.

In an alternative embodiment, as shown in FIG. 8, the transmission delay 602 is calculated using synchronization packets 802 included with the secondary audio program 510. Each synchronization packet 802 may include a time index, which indicates a time at which the secondary audio program 510 was digitized. Accordingly, the transmission delay 602 may be calculated by comparing a time index from a synchronization packet 802 with an indication of the time at which the synchronization packet 802 is received by the audio program reception component 508.

For instance, as shown in FIG. 7, a synchronization packet 802 may include a time index of 9:00:00, indicating that the corresponding portion of the secondary audio program 510 was digitized at precisely 9:00 AM. However, suppose the synchronization packet 802 is received by the audio program reception component 508 at 9:00:04 (or four seconds after 9:00 AM). In such a case, the synchronization module 512 may determine the transmission delay 602 to be approximately four seconds. Synchronization packets 802 may be inserted into the secondary audio program 510 at any suitable frequency in order to permit rapid determination of the transmission delay 602. While the above description uses an index with precision to one second for purposes of illustration, the present invention contemplates using an indices or timestamps which are precise to small fractions of a second. For example, MPEG timestamps may be utilized in this regard.

Of course, other techniques may be used to calculate the transmission delay 602. For example, various utilities (e.g., PING) may be used to calculate network latency, which is the time required for a packet to travel from a source to a destination within a network. Typically, however, the secondary audio program 510 is delayed by an amount greater than the network latency reported by such utilities. Accordingly, an additional amount of time may need to be added to the calculated latency in order to arrive at an approximation of the transmission delay 602.

Figure 9:
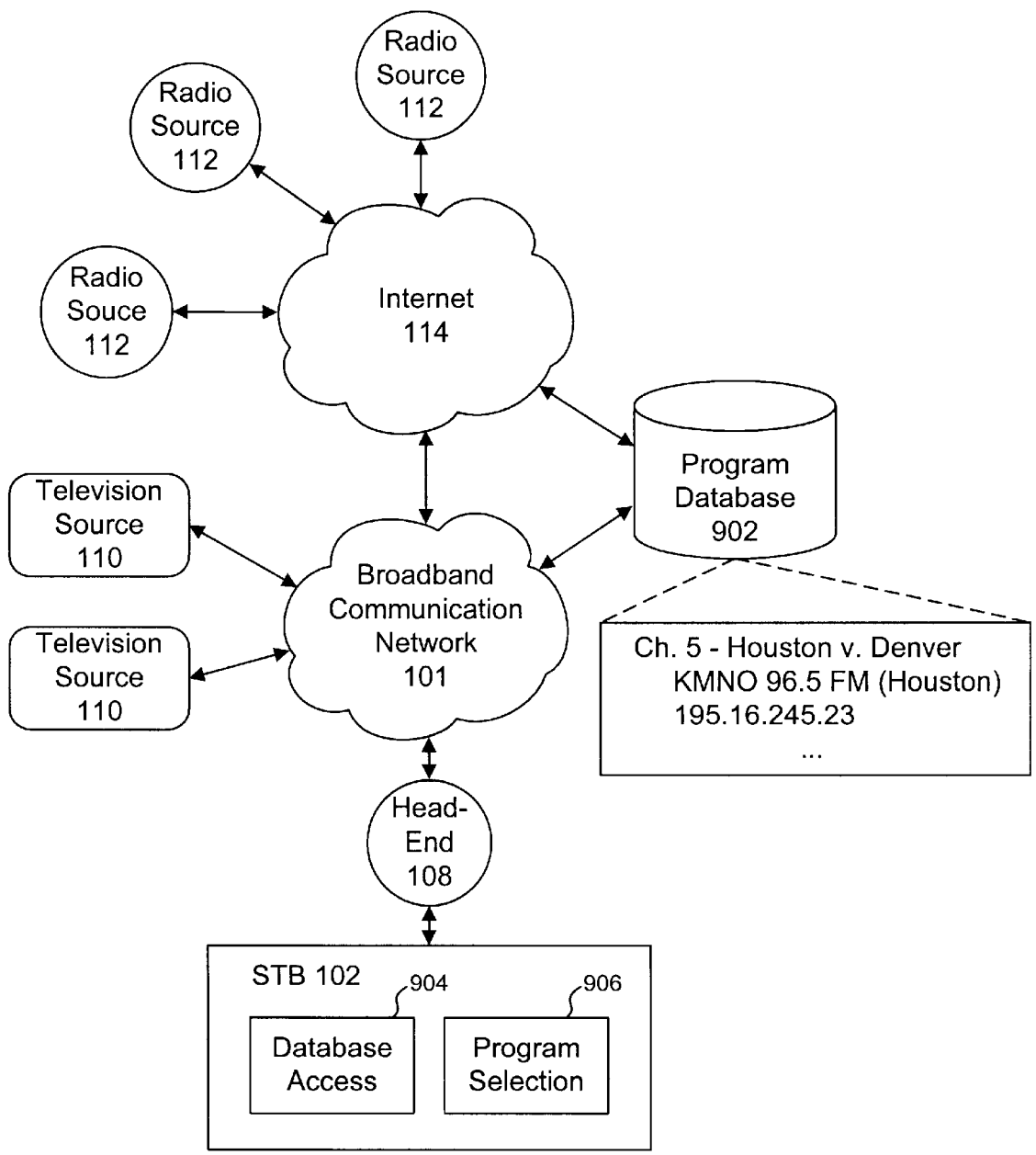
FIG. 9 is a block diagram of a communication system including a database for relating television programs to secondary audio programs.

FIG. 9 illustrates another aspect of the invention which relates to providing a user with a simple mechanism for identifying and selecting a secondary audio program 510 to replace a primary audio program 506 associated with a television broadcast.

As previously noted, both radio and television stations provide coverage for various sporting events, such as football, basketball, baseball, and the like. However, a user may not be aware of the radio stations that provide coverage of a televised event. Thus, it would be desirable to provide a user with a list of alternative audio sources for a particular television broadcast.

In one embodiment, a program database 902 is maintained of television programs and corresponding secondary audio programs 510 (e.g., radio programs). The database 902 may be stored on a server located within or accessible through the Internet 114, the network 101, or both. The database 902 may be embodied as a standard relational or hierarchical database, and may be integrated with server software for access using conventional protocols, such as CGI (Common Gateway Interface).

As shown in FIG. 9, the program database 902 may include an indication of a television program and/or channel, e.g., "Ch. 5—Houston v. Denver," as well as an indication of one or more radio stations providing simultaneous radio coverage, e.g., "KMNO 96.5 FM (Houston)." The indication of the radio channel(s) may include a network address (e.g., IP address), which indicates a digital audio server to be used by the audio program reception component 508. Of course, the database 902 may contain additional or different entries as needed.

As depicted, the STB 102 may further include a database access component 904 for accessing the program database 902. The database access component 904 may be embodied as a standard database client, agent application, or other access tool. In various embodiments, the database access component 904 retrieves television/radio information from the database 902 when needed by a user. Alternatively, the information may be retrieved at periodic intervals and locally cached by the STB 102 within the memory 306 or the storage device 310.

Figure 10:
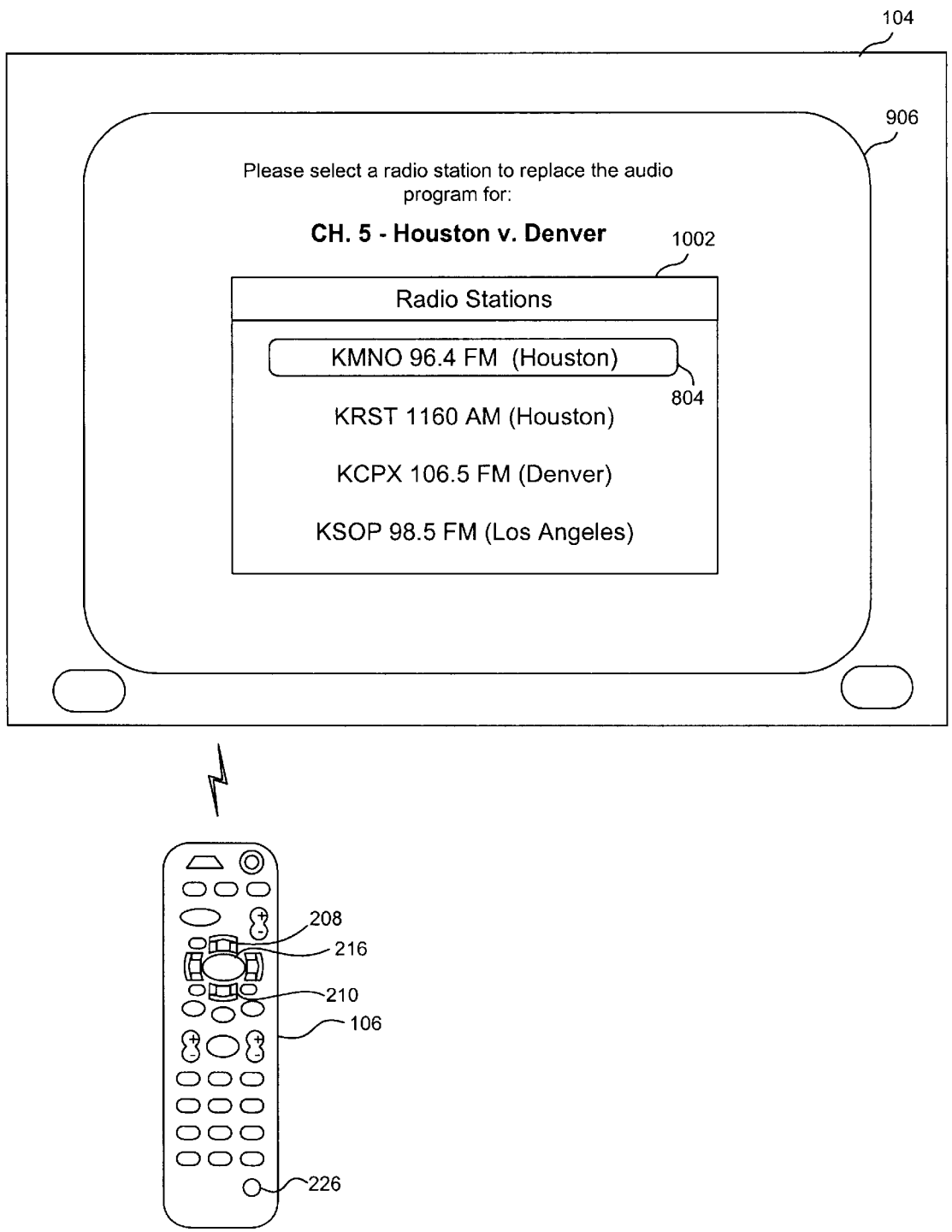
FIG. 10 is a user interface for selecting a secondary audio program to replace a primary audio program associated with a television transmission.

The STB 102 also includes, in one configuration, a program selection component 906, which allows a user to select a particular secondary audio program 510 to replace the primary audio program 506 associated with the television transmission. As shown in FIG. 10, a user may activate an alternative audio button 226 or the like on the remote control 106. In response, the program selection component 906 retrieves information about secondary audio programs 510 corresponding to the television program being viewed (from the database 902 or from a locally-cached copy within the STB 102).

In one configuration, the program selection component 906 generates a selection menu 1002 containing a list of possible sources of a secondary audio program 510. The program selection component 906 preferably identifies the television program for which replacement audio is desired.

A user may select a desired secondary audio program 510, for example, by moving a selection rectangle 1004 around (or otherwise highlighting) the desired source using the up and down arrow buttons 208, 210 of the remote control 106 and pressing the "Select" button 216. Of course, a variety of other user interfaces and selection techniques may be used within the scope of the present invention.

After the secondary audio program 510 is selected, the system 500 of FIG. 5 proceeds as described above to synchronize the video program 504 of the television transmission with the selected secondary audio program 510 and present the same to the user.

Figure 11:
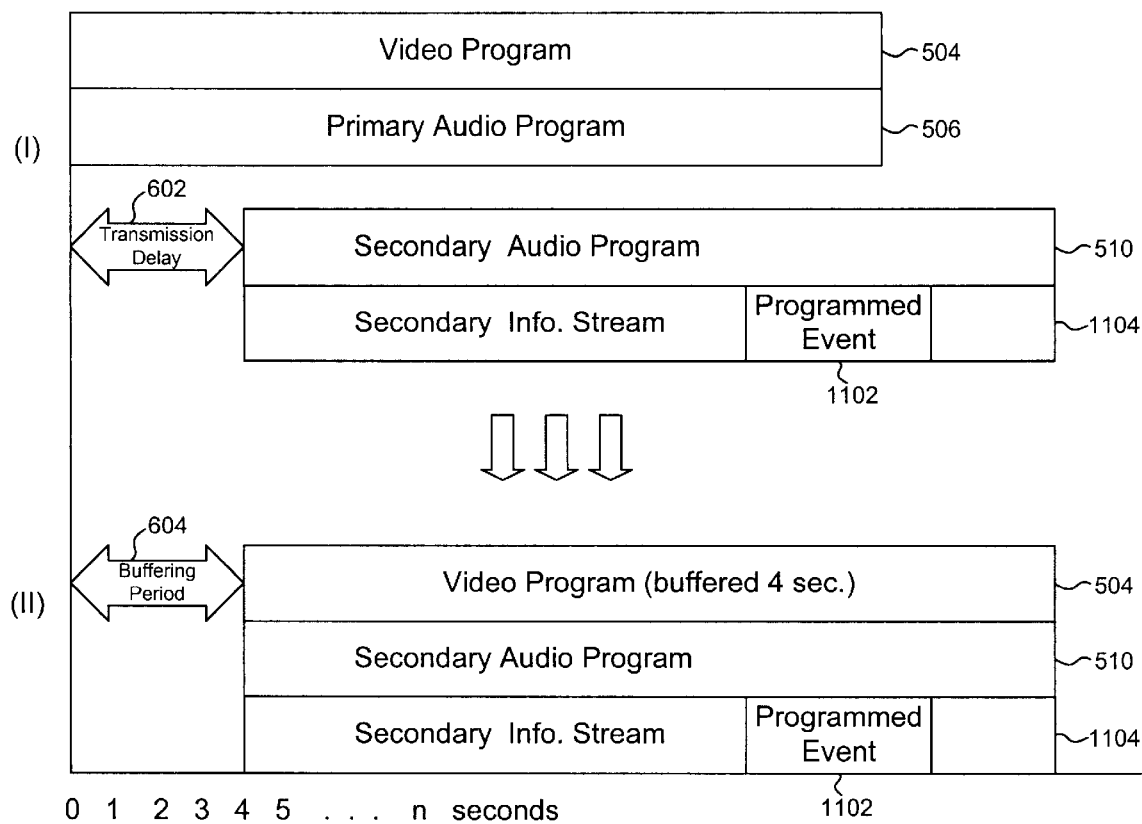
FIG. 11 is a time graph illustrating synchronization of a video program with programmed events.

FIG. 11 illustrates yet another embodiment of the invention in which the video program 504 is synchronized with one or more programmed events 1102. A programmed event 1102 is a directive to the STB 102 to perform a particular function, such as displaying text or icons or graphics or animation (for example, flash animation), playing streaming media such as video or music or audio clips, directing a browser to a particular web page, or the like.

For example, a producer of a secondary information stream 1104 may include a programmed event 1102 to display the career statistics of a baseball player who just hit a home run. Likewise, the producer may include a programmed event 1102 to display a graphical overlay of fireworks during the home run.

Because such programmed events 1102 may be received via the Internet 114 in a secondary information stream 1104, they may also subject to the transmission delay 602. Thus, a firework display configured to coincide with a home run may be delayed by several seconds. However, because the present invention synchronizes the video program 504 with the secondary information stream 1104, the programmed events 1102 are likewise synchronized.

The present invention contemplates synchronizing various combinations of signals received via different media. For example, a secondary audio program 510 could be synchronized with an information stream including, for example, flash animation. Thus, the present invention should not be limited to synchronizing a video program 504 with a secondary audio program 510.

Figure 12:
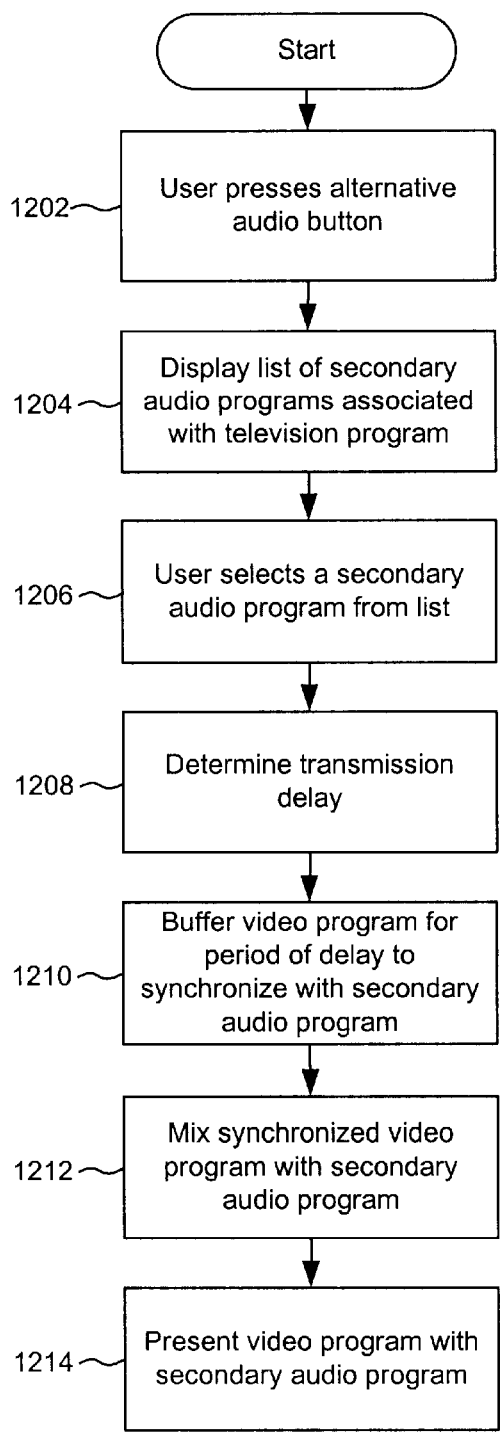
FIG. 12 is a flowchart of a method for synchronizing a video program with a secondary audio program.

FIG. 12 is a flowchart of a method 1200 for providing an alternative audio program during a television broadcast comprising a video program 504 and a primary audio program 506. The method 1200 begins when a user presses an alternative audio button 226 or other suitable control. Thereafter, a list 1002 is displayed 1204 of secondary audio programs 510 corresponding to the video program 504. As noted above, the list 1002 may be compiled from a program database 902 or the like. A user then selects 1206 a secondary audio program 510 from the list 1002.

In one embodiment, a transmission delay 602 for the secondary audio program 510 is determined 1208. Thereafter, the video program 504 is buffered 1210 for a period of time equal to the transmission delay 602 in order to synchronize it with the secondary audio program 510. Next, the synchronized video program 504 is mixed 1212 with the secondary audio program 510, after which the video program 504 is presented 1214 with the secondary audio program 1214 on a television 104 or other display device.

In view of the foregoing, the present invention offers numerous advantageous not available in conventional approaches. For example, the present invention includes a system and method for synchronizing a video program from a television broadcast with a secondary audio program generated simultaneously with the video program, such as a radio program received via the Internet. The present invention also includes a system and method for allowing a user to easily select a secondary audio program to be presented in connection with a television program.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for providing an alternative audio program during a television broadcast, the method comprising:

intercepting a television transmission comprising a video program and a primary audio program;

receiving through a slower transmission medium a secondary audio program generated simultaneously with and related to the video program, wherein the slower transmission medium causes reception of the secondary audio program to be delayed with respect to the video program;

synchronizing the video program with the secondary audio program; and presenting the synchronized video program with the secondary audio program.

2. The method of claim 1, wherein the secondary audio program is received via the Internet.

3. The method of claim 1, wherein the secondary audio program comprises a radio program.

4. The method of claim 3, wherein the television transmission relates to a sporting event and the radio program comprises a radio commentary pertaining to the sporting event.

5. The method of claim 1, wherein synchronizing comprises:

buffering the video program in a storage device for a buffering period.

6. The method of claim 5, wherein the buffering period is from about three seconds to about four seconds.

7. The method of claim 1, wherein synchronizing comprises:

buffering the video program in a personal video recorder (PVR) device.

8. The method of claim 1, wherein synchronizing comprises:

buffering the video program in a random access memory.

9. The method of claim 1, wherein synchronizing comprises:

determining a transmission delay associated with the secondary audio program; and buffering the video program in a storage device for a buffering period equal to the transmission delay.

10. The method of claim 9, wherein the secondary audio program comprises a time index, and wherein determining:

comparing the time index with an indication of a time at which the time index is received with the secondary audio program.

11. The method of claim 9, wherein determining comprises:

buffering the video program in the storage device for a default buffering period;

presenting the video program with the secondary audio program; and adjusting the buffering period in response to user feedback.

12. The method of claim 1, wherein displaying comprises:

mixing the synchronized video program with the second audio program.

13. The method of claim 1, further comprising:

displaying an indication of at least one secondary audio program generated simultaneously with and related to the video program; and receiving a user selection of a secondary audio program from the list.

14. The method of claim 13, wherein displaying comprises:

accessing a database comprising an indication of a television program and at least one indication of a secondary audio program generated simultaneously with and related to the television program.

15. The method of claim 13, wherein the list is displayed in response to a user activating a specifically-designated button a remote control device.

16. A system for providing an alternative audio program during a television broadcast, the method comprising:

a transmission interception component configured to intercept a television transmission comprising a video program and a primary audio program;

an audio program reception component configured to receive with the television transmission through a slower transmission medium a secondary audio program generated simultaneously with and related to the video program, wherein the slower transmission medium causes reception of the secondary audio program to be delayed with respect to the video program;

a synchronizing component configured to synchronize the video program with the secondary audio program, and a presentation component configured to present the synchronized video program with the secondary audio program.

17. The system of claim 16, wherein the secondary audio program is received via the Internet.

18. The system of claim 16, wherein the secondary audio program comprises a radio program.

19. The system of claim 18, wherein the television transmission relates to a sporting event and the radio program comprises a radio commentary pertaining to the sporting event.

20. The system of claim 16, further comprising:

a buffering component configured to buffer the video program in a storage device for a buffering period.

21. The system of claim 20, wherein the buffering period is from about three seconds to about four seconds.

22. The system of claim 20, wherein the storage device comprises a personal video recorder (PVR) device.

23. The system of claim 20, wherein the storage device comprises a random access memory.

24. The system of claim 16, wherein the synchronization component is further configured to determine a transmission delay associated with the secondary audio program; and wherein the buffering component is further configured to buffer the video program in a storage device for a buffering period equal to the transmission delay.

25. The system of claim 24, wherein the secondary audio program comprises a time index, and the synchronization component is further configured to compare the time index with an indication of a time at which the time index is received with the secondary audio program.

26. The system of claim 24, wherein the buffering component is further configured to buffer the video program in the storage device for a default buffering period;

wherein the presentation component is further configured to present the video program with the secondary audio program; and wherein the synchronization component is further configured to adjust the buffering period in response to user feedback.

27. The system of claim 16, further comprising:

a mixing component configured to mix the synchronized video program with the second audio program.

28. The system of claim 16, further comprising:

a program selection component configured to display an indication of at least one secondary audio program generated simultaneously with and related to the video program and receive a user selection of a secondary audio program from the list.

29. The system of claim 28, further comprising:

a database access component configured to access a database comprising an indication of a television program and at least one indication of a secondary audio program generated simultaneously with and related to the television program.

30. The system of claim 28, wherein the list is displayed in response to a user activating a specifically-designated button a remote control device.

* * * * *